United States Patent
Kawamura et al.

[15] 3,645,761
[45] Feb. 29, 1972

[54] GLASS SOLDER

[72] Inventors: Susumu Kawamura; Fumio Yamaguchi, both of Otsu-shi, Japan

[73] Assignee: Nippon Electric Glass Company, Limited, Tokyo, Japan

[22] Filed: Nov. 24, 1969

[21] Appl. No.: 879,558

[30] Foreign Application Priority Data

Dec. 23, 1968 Japan....................................43/93768

[52] U.S. Cl. ............................106/53, 106/39 DV, 106/47, 106/54
[51] Int. Cl. ......................C03c 3/10, C03c 3/04, C03c 3/08
[58] Field of Search............................106/53, 49, 47, 39 DV

[56] References Cited

UNITED STATES PATENTS

| | | | |
|---|---|---|---|
| 2,584,974 | 2/1952 | Armistead | 106/53 |
| 2,726,161 | 12/1955 | Beck et al. | 106/53 X |
| 3,206,355 | 9/1965 | Pfaender | 106/49 |

FOREIGN PATENTS OR APPLICATIONS

| | | | |
|---|---|---|---|
| 751,572 | 6/1956 | Great Britain | 106/47 |

Primary Examiner—James E. Poer
Assistant Examiner—M. Bell
Attorney—Kurt Kelman

[57] ABSTRACT

A glass solder composition comprising a mixture of a major portion of lead oxide, bismuth trioxide, boron trioxide, zinc oxide, silicon dioxide, and a minor amount of additional oxide chosen from one or more of the group of sodium monoxide, potassium monoxide, lithium oxide and barium oxide.

1 Claim, No Drawings

GLASS SOLDER

The present invention relates to glass solders, and in particular to an improved solder for sealing specialized glass objects, such as television picture tubes and the like.

Many specialized glass objects, such as cathode-ray tubes, television picture tubes, kinescopes, etc., are conventionally made of two or more pieces of glass welded or soldered together to form an envelope of complex shape. In final use, the unit may be placed under strenuous conditions, such as high vacuum or pressure, which require that the bonding and welding be done with absolute security and effectiveness.

As a particular example, a television picture tube is made of at least two major parts, the face plate and the flare or funnel which are welded together by the introduction of a solder therebetween. Under the application of heat, the solder crystallizes and bonds the parts together.

It is well known that a suitable glass solder is required to have combined low melting and crystallization points, preferably lower than that of the glass it is bonding, and yet have a coefficient of expansion substantially equal to that glass. To this date, conventional solders have employed compositions of lead oxide—boron trioxide—and silicon dioxide ($PbO-B_2O_3-SiO_2$) in varying proportions, which in general has been satisfactory. Such compositions, however, have a tendency to soften at about 385° C., and melt and crystallize at about 450° C., precluding the carrying out of the final soldering or sealing process below these temperature levels. Consequently, since the glass employed, for example in television tubes itself reaches a critical stage at about 450° C., a great deal of thermal deformation has been encountered during the sealing process with the use of this conventional solder. A high rate of rejected product, coupled with the increases of cost in labor and materials has made this a major industry problem. A further disadvantage of the conventional solder is inherent also in the necessity for conducting the process at a high-temperature level since, as a result, the productive capacity of both automatic machines and manual labor is small.

It is the object of the present invention to provide an improved glass solder overcoming the disadvantages of conventional solders.

It is another object of the present invention to provide an improved glass solder for sealing high-pressure and high-vacuum glass units.

It is another object of the present invention to provide a glass solder having low crystalline and low melting point yet having improved fusion characteristics.

It is a specific object of the present invention to provide a glass solder for sealing the face plate and funnel of television picture tubes into a unitary envelope.

According to the present invention there has been provided a glass solder comprising a lead oxide (PbO), bismuth trioxide ($Bi_2O_3$), boron trioxide ($B_2O_3$), zinc oxide (ZnO) and silicon dioxide ($SiO_2$) base to which is added a small amount of an additional oxide chosen from one or more of the group of sodium monoxide ($Na_2O$), potassium monoxide ($K_2O$) and lithium oxide ($Li_2O$), or barium oxide ($BaO_2$).

The glass solder composition of the present invention softens at about 330° C. and melts and crystallizes somewhere between 425° and 430° C. The coefficient of expansion of the present solder over a temperature range of 0°–430° C. varies between $90°-100°\times10^{-7}$, which closely falls within the range of the glass used in television picture tubes.

It is preferable that the composition have a total oxide component of more than 98 percent to provide a solder which is substantially pure oxide with little or no contaminates or other constituents. It will be readily seen that the present solder has the advantage of softening and melting at a temperature range 20°–25 C. lower than conventional solders and yet retains all of their other characteristics.

EXAMPLE I

In proportions by weight, 67.0%PbO, 7.4%$Bi_2O_3$, 9.8%$B_2O_3$, 13.6%ZnO, 1.0%$SiO_2$, 1.0%$Na_2O$, 0.1%$K_2O$, and 0.1%$Li_2O$, were mixed and melted in a platinum crucible at a temperature of between 1,100° and 1,200° C. for approximately 30 minutes. The resultant liquid was poured into a porcelain pot and solidified by rapid cooling. It was then crushed in a conventional crusher into a fine powder capable of passing through a 200-mesh screen.

The powder composition was employed to solder the face plate and funnel part of a color TV picture tube by first mixing it with an ethyl acetate solution containing approximately 1 percent of nitrocellulose at a weight ratio of 10–1 and then formed into a paste. The paste was coated on the surface of the funnel to be sealed and allowed to dry. The face plate of the TV tube was thereafter mounted on the funnel and the two were heated from ambient room temperature to a maximum temperature between 425°–430° C. at the rate of 9° C. per minute.

It was found that the solder of the present invention began to soften at about 330° C. and melt and flow at the maximum temperature reached, at which time it covered all of the surfaces to be sealed.

The face plate and funnel assembly were maintained at the maximum temperature for about 60 minutes at which time the soldered glass completely crystallized and sealed the face plate to the funnel. The face plate and funnel were then cooled at a suitable rate to prevent deformation.

When fully cooled, the crystalline material of the solder glass showed a thermal coefficient of expansion over the temperature range from 0°–430° C. of between $90°-100°\times10^{-7}$ which was also the range of the glass employed in the face plate and funnel, and physical structural characteristics within the conventional standards.

It is to be noted that the crystallization point and the melting point of the glass solder according to the example is lower by about 20°–25° than that of the conventional solder glass, and that the rate for full crystallization (about 60 minutes) is well within the safety range to avoid deformation of the glass work pieces.

The following table of examples illustrates three additional compositions made in accordance with the present invention.

TABLE 1

|  | Expl. 1 | Expl. 2 | Expl. 3 |
|---|---|---|---|
| PbO | 65.9 | 69.6 | 64.4 |
| $Bi_2O_3$ | 8.6 | 4.9 | 9.8 |
| $B_2O_3$ | 10.0 | 9.8 | 9.8 |
| ZnO | 13.5 | 12.7 | 13.7 |
| $SiO_2$ | 0.9 | 1.5 | 1.0 |
| $Na_2O$ | 0.8 | 1.0 | 0.9 |
| $K_2O$ | – | 0.3 | – |
| $Li_2O$ | 0.3 | 0.2 | 0.1 |
| BaO | – | – | 0.1 |

In each of the above examples the specific constituents are combined as raw materials in exactly the same manner as in Example 1. A fine powder was produced and also mixed with an nitrocellulose solution carrier into a paste and applied to the surfaces of the workpieces. The workpieces were then placed under heat and raised to a temperature as described in Example 1 until the crystalline structure was formed, and then cooled. The resultant structural advantages found in Example 1 were again observed with each of the above examples.

The above examples are illustrative of compositions made in accordance with the present invention. It has been found that the constituents may vary in their proportional weight within certain ranges. For example, it has been found that anywhere between 64 to 70 percent by weight of the lead monoxide (PbO) and 4–10 percent of the bismuth trioxide ($Bi_2O_3$) may be used, provided that the total lead monoxide and bismuth trioxide ($PbO+Bi_2O_3$) falls within a range of 70 to 76 percent by weight of the total composition.

Additionally, the boron trioxide ($B_2O_3$) may vary within the range of 9–12 percent, the zinc oxide (ZnO) between 12.5–15 percent, the silicon dioxide ($SiO_2$) between 0.5–1.5 percent and the remainder of the oxides in toto between 0.1–1.5 percent. The last constituent which has been defined as a remainder may in fact be any one of or a combination of the sodium ($Na_2O$), potassium ($K_2O$), lithium ($Li_2O$) or barium oxide (BaO).

In determining the various ranges noted above, it has been found empirically that a lead oxide (PbO) content below 64 percent produces a glass solder which has such poor fluidity that it will not flow to cover the workpiece in a uniform manner, while glass solders containing more than 70 percent of the lead oxide (PbO) have exhibited greater coefficient of expansion in the crystallized form than those of any known glass material used for TV picture tubes. Above the range of 70 percent, therefore, it has been found that the end product has been highly susceptible to cracks and breakage due to thermal expansion.

A glass solder having less than 4 percent bismuth trioxide ($Bi_2O_3$) is too quick in crystallization to permit the proper, efficient and secure sealing while solders containing more than 10 percent have been found not to crystallize at 430° C. Solders wherein the lead oxide and bismuth trioxide ($PbO+Bi_2O_3$) in total is below 70 percent have exhibited both bad fluidity and such a low coefficient of expansion that cracking takes place while the same combination of constituents at above 76 percent has too high a rate of thermal expansion so as not to be suitable for use as a solder. It will thus be seen that the relationship between the lead oxide (PbO) and the bismuth trioxide ($Bi_2O_3$) is somewhat dependent on each other and that a major feature of the present invention is the combination of these two materials.

Glass solders wherein boron trioxide is below 9 percent have exhibited difficulty in homogenizing in crystalline form while the glass solder containing more than 12 percent of this material exhibit poor fluidity. Solders employing less than 12.5 percent zinc oxide require an inordinately long time in the crystallization process while glasses containing more than 15 percent of this constituent exhibit poor homogeneity.

Solders having less than 0.5 percent of silicon dioxide crystallize too quickly while having more than 1.5 percent of this constituent does not crystallize readily. Glasses wherein the remaining oxide in total is below 0.1 percent have bad fluidity while the solders containing more than 1.5 percent of these constituents crystallize too quickly.

In consequence it will be observed that the solder of the present invention can be made in varying forms and percentages of constituents, however critical the composition may at first appear.

It will be apparent that the present invention provides a glass solder having suitably low melting and crystallization points and a comparable range of coefficients of expansion. The present solder has great advantage in that its melting point is significantly lower than hereto known solders while maintaining the same standards of fusion and structural strength.

The present disclosure is to be taken as illustrative only.

What is claimed:

1. A glass solder consisting essentially of a mixture of 64–70 percent oxide, 4–10 percent bismuth trioxide, the total amount of lead oxide and bismuth trioxide being between 70 percent and 76 percent of the mixture, 9–12 percent boron trioxide, 12.5–15 percent zinc oxide, 0.5–1.5 percent silicon dioxide, and 0.1–1.5 percent of one or more of the oxides of sodium, potassium, lithium and barium, all percentages being by weight.

* * * * *